United States Patent
Yoshifuji et al.

(10) Patent No.: US 11,711,408 B2
(45) Date of Patent: Jul. 25, 2023

(54) CONTENT APPEARANCE CONVERSION FOR REMOTE APPLICATION SHARING

(71) Applicant: INTERNATIONAL BUSINESS MACHINES CORPORATION, Armonk, NY (US)

(72) Inventors: Nobuyuki Yoshifuji, Kawasaki (JP); Mayumi Goto, Ayase (JP); Timothy Waileong Koh, Tokyo (JP); Sho Ayuba, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 66 days.

(21) Appl. No.: 17/443,350

(22) Filed: Jul. 26, 2021

(65) Prior Publication Data

US 2023/0028495 A1 Jan. 26, 2023

(51) Int. Cl.

| | |
|---|---|
| H04L 29/06 | (2006.01) |
| G06F 9/451 | (2018.01) |
| G06F 8/51 | (2018.01) |
| H04L 65/403 | (2022.01) |
| H04L 65/65 | (2022.01) |

(52) U.S. Cl.
CPC .............. *H04L 65/403* (2013.01); *G06F 8/51* (2013.01); *G06F 9/452* (2018.02); *H04L 65/65* (2022.05)

(58) Field of Classification Search
CPC ..... H04L 65/403; H04L 65/608; G06F 9/452; G06F 8/51
See application file for complete search history.

(56) References Cited

U.S. PATENT DOCUMENTS

| | | |
|---|---|---|
| 7,634,540 B2 | 12/2009 | Ivashin |
| 9,049,338 B2 | 6/2015 | Witt |
| 9,386,275 B2 | 7/2016 | Oyman |

(Continued)

FOREIGN PATENT DOCUMENTS

JP 2019096330 A 6/2019

OTHER PUBLICATIONS

Mell, et al., "The NIST Definition of Cloud Computing," National Institute of Standards and Technology, Special Publication 800-145, Sep. 2011, pp. 1-7.

(Continued)

*Primary Examiner* — Nazia Naoreen
(74) *Attorney, Agent, or Firm* — Caleb D. Wilkes (57) ABSTRACT

A method, computer system, and a computer program product for application sharing are provided. Setting information that includes a display preference of a receiver is received. Application content from a host computer is received. The application content includes at least one screen image. The at least one screen image is converted according to the setting information. The converted screen image is transmitted to a receiver computer for real-time screen sharing with the host computer. A host controller action signal is received. The host controller action signal represents a host controller action at the host computer. A content modification is transmitted to the receiver computer for the real-time screen sharing and for displaying with the converted at least one screen image. The content modification corresponds to the host controller action.

25 Claims, 6 Drawing Sheets

(56) References Cited

U.S. PATENT DOCUMENTS

| | | | |
|---|---|---|---|
| 9,514,333 B1* | 12/2016 | Patel | G06F 21/6245 |
| 9,635,091 B1* | 4/2017 | Laukkanen | G06F 3/1423 |
| 9,992,245 B2 | 6/2018 | Deluca | |
| 10,402,076 B2 | 9/2019 | Sherman | |
| 10,474,416 B1* | 11/2019 | Farivar | H04L 67/535 |
| 10,809,895 B2* | 10/2020 | Denoue | G06F 3/04842 |
| 2009/0300510 A1 | 12/2009 | Gantman | |
| 2011/0010629 A1* | 1/2011 | Castro | H04L 67/38 |
| | | | 455/414.3 |
| 2013/0073965 A1 | 3/2013 | Sik | |
| 2013/0139076 A1 | 5/2013 | Mochizuki | |
| 2015/0106227 A1 | 4/2015 | Gottlieb | |
| 2015/0381935 A1 | 12/2015 | Thomas | |
| 2016/0170617 A1 | 6/2016 | Shi | |
| 2017/0118258 A1* | 4/2017 | Lieb | G06F 9/452 |
| 2017/0255345 A1* | 9/2017 | Veeramani | G06F 11/3072 |
| 2020/0210057 A1 | 7/2020 | Yoshihashi | |
| 2021/0065584 A1* | 3/2021 | O'Reilly | G06F 3/04847 |

OTHER PUBLICATIONS nesuke.com, "[Remote Desktop] Mechanism and Security Enhancements—Internet Connection and Encryption," Apr. 7, 2020, 14 pgs. English translation and 13 pgs. original article, [accessed Jul. 23, 2021], Retrieved from the Internet: <https://milestone-of-se.nesuke.com/sv-basic/windows-basic/remote-desktop-security/>, Machine Translated.

Yoosh, "Remote development and debugging with visual studio 2019 source code," Nov. 23, 2019, 12 pgs. English translation and 11 pgs. original article, [accessed Jul. 23, 2021], Retrieved from the Internet: <https://blog.goo.ne.jp/yoossh/e/10fa6e6ee04bb27df467db671304071f>, Machine Translated.

* cited by examiner

CONTENT APPEARANCE CONVERSION FOR REMOTE APPLICATION SHARING

BACKGROUND

The present invention relates generally to screen sharing tools for online meetings and to improving the viewing experience of recipients of the screen sharing.

In screen sharing tools for digital remote meetings, the display screen on the host side displays content and a screen view that are also displayed on the display screen on the client side. This content is displayed on the client side with the same manner and characteristics as the content is displayed on the host side. The content on the client side is displayed on the screen with a color, a font, a zoom level, and with other appearance characteristics for the application that are set on the host side. These appearance characteristics may be chosen to be suitable for the host viewing at the host computer.

JP 2019-096330 A discloses a screen sharing system and method. When screen sharing starts for a receiver user terminal, image quality for the images on the display screen of the receiver user terminal is set based on a resolution of the receiver user terminal. This resolution of the receiver user terminal is stored as attribute information.

In some instances, the individual client participants of a virtual meeting who are receiving the screen sharing may have special viewing needs. The appearance characteristics chosen by the host for the shared content may interfere with optimal viewing for individual clients who will view the content at their own respective computers.

SUMMARY

According to one exemplary embodiment, a computer-implemented method for application sharing is provided. Setting information that includes a display preference of a receiver is received. Application content from a host computer is received. The application content includes at least one screen image. The at least one screen image is converted according to the setting information. The converted screen image is transmitted to a receiver computer for real-time screen sharing with the host computer. A host controller action signal is received. The host controller action signal represents a host controller action at the host computer. A content modification is transmitted to the receiver computer for the real-time screen sharing and for displaying with the converted at least one screen image. The content modification corresponds to the host controller action. A computer system and computer program product corresponding to the above method are also disclosed herein.

With this embodiment, content that is screen shared may be displayed in an improved individualized manner that helps engage individual clients who have particular viewing needs and who might typically experience low visual acuity. The content may be displayed in a manner that is particularly comfortable for a client individual to view. Thus, this embodiment may help improve accessibility for viewers to be engaged by online meeting content.

In additional embodiments, setting information for respective unique display preferences of multiple receivers is received. The at least one screen image is uniquely converted according to each of the respective unique display preferences. The uniquely converted at least one screen images are respectively transmitted to multiple receiver computers for real-time screen sharing with the host computer. The content modification is transmitted to each of the multiple receiver computers for displaying with the uniquely converted screen images as part of the real-time screen sharing.

With these embodiments, unique customizations for multiple receiver computers may be simultaneously generated to allow customization for an audience with unique viewing needs.

In additional embodiments, the application content that is shared may be from a source code editor, from a web browser, and/or from a document editing tool.

With these embodiments, the type of content that may be screen shared in an improved individualized manner may be expanded.

In additional embodiments, the display preference that governs the screen image conversion includes a color, a font, a font size, and/or a zoom level of the application content that is shared with the receiver computer.

With these embodiments, individual clients who better recognize particular colors or fonts or magnification levels may be better engaged with shared content during screen sharing for remote meetings.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, and computer program product for meeting content presentation adjustment in virtual meetings to improve the viewing and learning experience of individuals who are receiving the virtual meeting. Business, schools, social groups, etc. are spending more time using virtual meeting tools that allow users at different physical locations to communicate and share information with each other via audio-visual technology, computers, and network communications such as the internet. Presentations, documents, murals, spreadsheets, boards, images, videos, and demonstrations have been used in virtual meetings. The present embodiments help improve virtual meeting software and, hence, the virtual meetings themselves by allowing the information that is delivered to have an improved customized presentation which may better capture the attention of and engage those individuals who are watching at end devices. The present embodiments will help the presenters to be able to present more engaging content. The present embodiments may also facilitate usage of virtual meetings that are repeated on a scheduled basis by avoiding ephemeral set up of receiver preferences. Thus, the present embodiments may improve the library of virtual meeting software.

Figure 1:
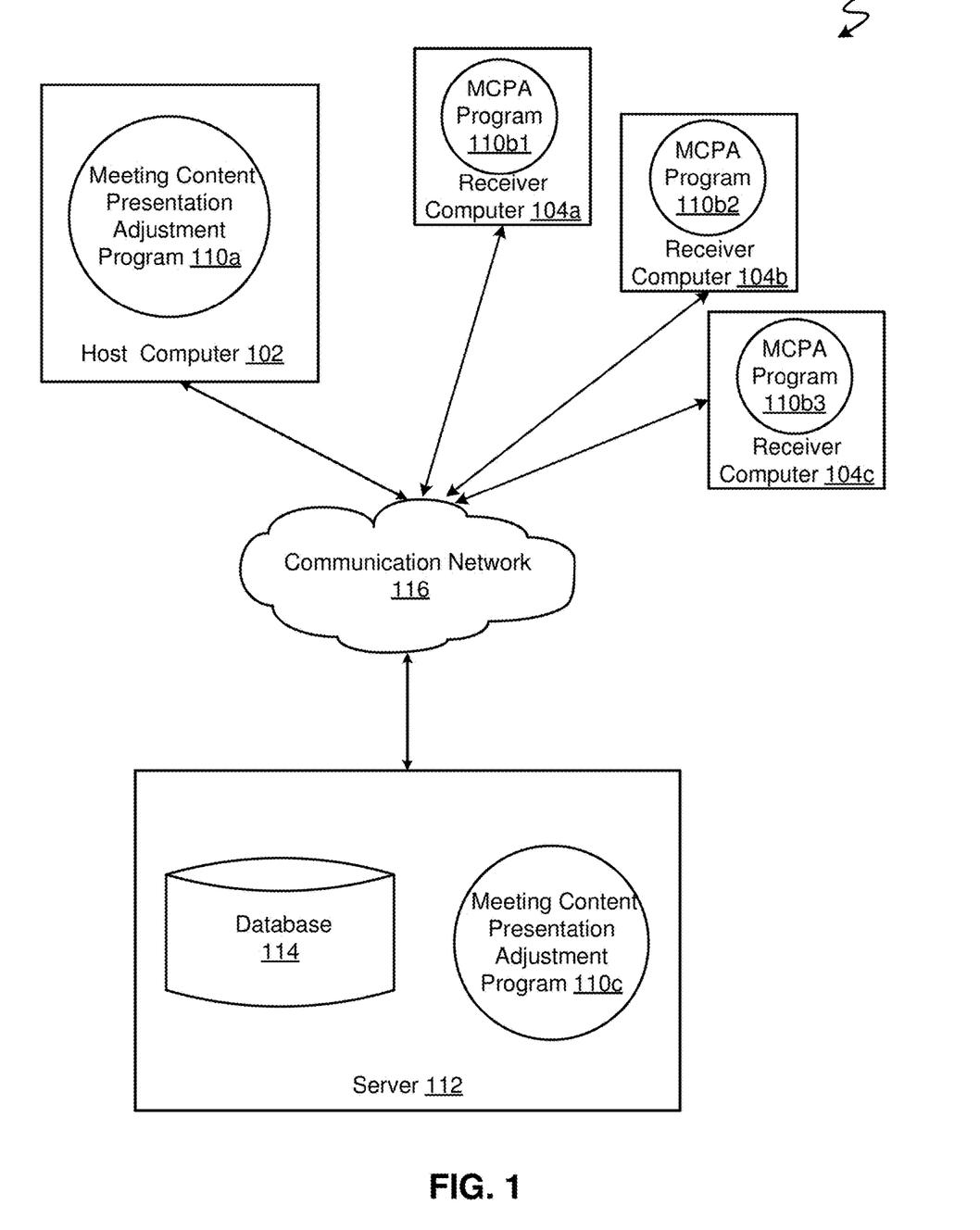
FIG. 1 illustrates a networked computer environment according to at least one embodiment.

Referring to FIG. 1, a networked computer environment 107 in accordance with one embodiment is depicted. The networked computer environment 107 may include a host computer 102 and first, second, and third receiver computers 104a, 104b, and 104c, respectively, that are each enabled to run meeting content presentation adjustment program 110a, 110b1, 110b2, and 110b3, respectively. The networked computer environment 107 may also include a server 112 that is a computer and that is enabled to run meeting content presentation adjustment program 110c that may interact with a database 114. The various computers, e.g., the host computer 102, the first, second, and third receiver computers 104a, 104b, and 104c, and the server 112, may communicate with each other via a communication network 116. The networked computer environment 107 may include many computers and many servers, although four computers and one server 112 are shown in FIG. 1. The communication network 116 allowing communication between the host computer 102, the first, second, and third receiver computers 104a, 104b, and 104c, and the server 112 may include various types of communication networks, such as the Internet, a wide area network (WAN), a local area network (LAN), a telecommunication network, a wireless network, a public switched telephone network (PTSN) and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The host computer 102 may communicate with the server 112 and with the first, second, and third receiver computers 104a, 104b, and 104c via the communication network 116. The communication network 116 may include connections, such as wire, wireless communication links, or fiber optic cables. The communication network 116 may itself include multiple servers such as a network edge server and an edge/gateway server which may be enabled to run or assist in operation of the meeting content presentation adjustment. The communication network 116 may in some embodiments be or include high speed networks such as 4G and 5G networks. Implementing the present meeting content presentation adjustment embodiments in a 5G network will enable at least some embodiments to be implemented on the edge in order to boost network performance.

Figure 4:
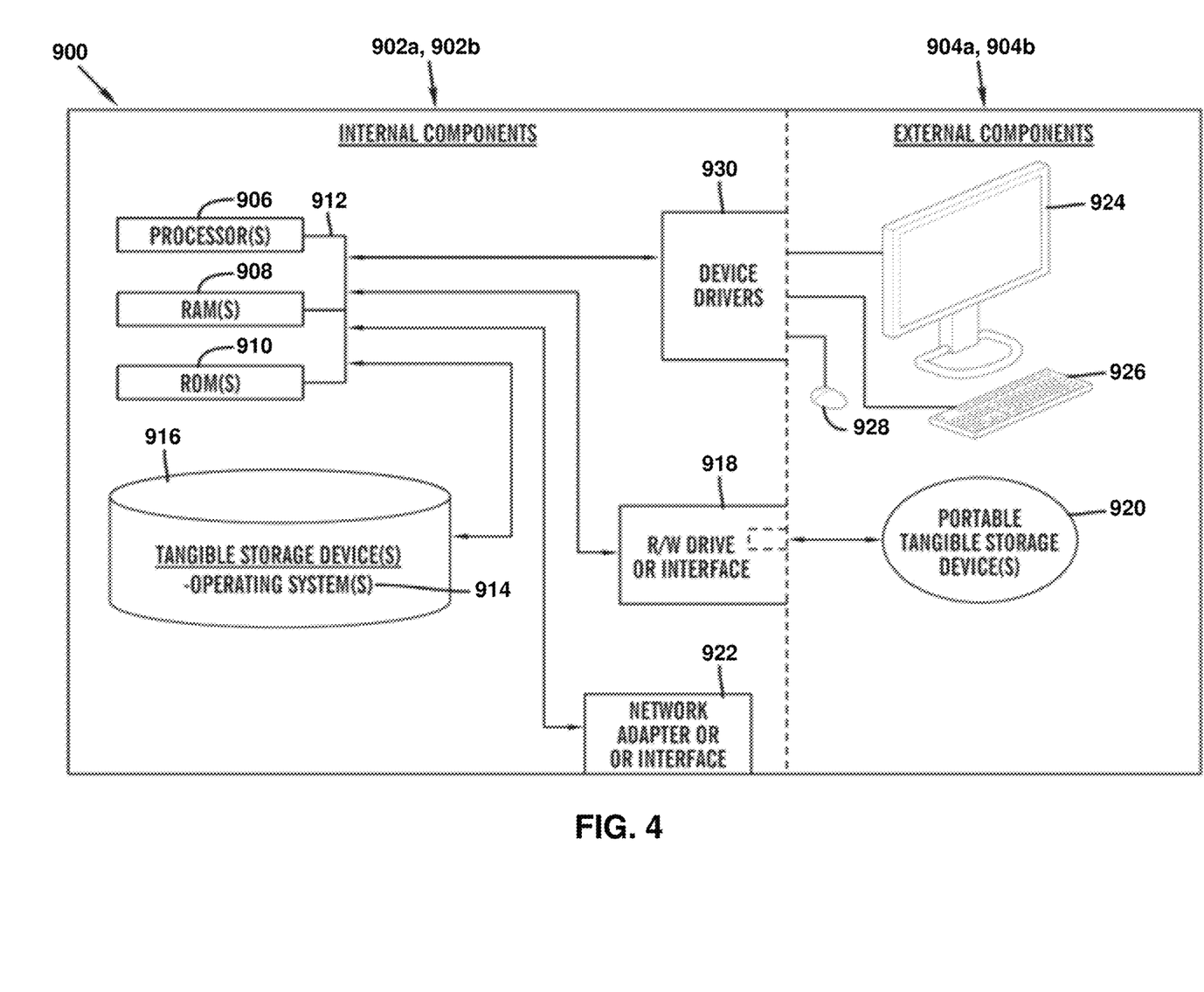
FIG. 4 is a block diagram of internal and external components of computers, phones, and servers depicted in FIG. 1 according to at least one embodiment.

As will be discussed with reference to FIG. 4, the server 112 may include internal components 902a and external components 904a, respectively. The host computer 102 and the first, second, and third receiver computers 104a, 104b, and 104c may also each include internal components 902b and external components 904b as depicted in FIG. 4. Server 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. The host computer 102 and the first, second, and third receiver computers 104a, 104b, and 104c may each be, for example, a mobile device, a telephone, a personal digital assistant, a netbook, a laptop computer, a tablet computer, a desktop computer, or any type of computing devices capable of running a program, accessing a network, and accessing a database 114 in a server 112 that is remotely located with respect to the host computer 102 and with respect to the first, second, and third receiver computers 104a, 104b, and 104c. The host computer 102 and the first, second, and third receiver computers 104a, 104b, and 104c may each include a display screen, a speaker, a microphone, a camera, and a keyboard or other input device for better presenting audiovisual material used in virtual meetings, for recording audiovisual material to transmit to others who are participating in a virtual meeting, and to provide feedback to presentations. According to various implementations of the present embodiment, the meeting content presentation adjustment program 110a, 110b1, 110b2, 110b3, 110c may interact with a database 114 that may be embedded in various storage devices, such as, but not limited to a various computers/mobile devices, a server 112 that may be in a network, or another cloud storage service.

Usage of storing content on edge servers may reduce network traffic that is required for execution of a virtual meeting that includes the meeting content presentation adjustment described herein. This reduction in network traffic may help achieve efficient processing for execution of the methods according to the present embodiments. As a content deliverer may log into a virtual meeting at the host computer 102 and as individuals receiving the content log into the virtual meeting at first, second, or third receiver computers 104a, 104b, and 104c, respectively, the deliverer and the receiver individuals may utilize their network infrastructure to gain appropriate connectivity, e.g., 5G connectivity, into the environment. The present embodiments may take advantage of existing and future 5G infrastructure and its increase of bandwidth, latency, and scaling of applications requiring large amounts of real-time data. The server 112 may trigger data and command flows to be processed by distributed enhanced experience capability programs that are available at a network edge server located at a network edge and/or that are available at an edge/gateway server located at a network gateway. Summarization of preferences and usage data can also flow from the edge gateway/server through the network edge server for access by the server 112 which implements enhanced experience capability in the virtual meeting tool.

A computer system with the meeting content presentation adjustment program 110a, 110b1, 110b2, 110b3, 110c operates as a special purpose computer system in which the meeting content presentation adjustment process 200 assists in the presentation of a virtual meeting. In particular, the meeting content presentation adjustment program 110a, 110*b*1, 110*b*2, 110*b*3, 110*c* transforms a computer system into a special purpose computer system as compared to currently available general computer systems that do not have the meeting content presentation adjustment program 110*a*, 110*b*1, 110*b*2, 110*b*3, 110*c*.

Figure 2:
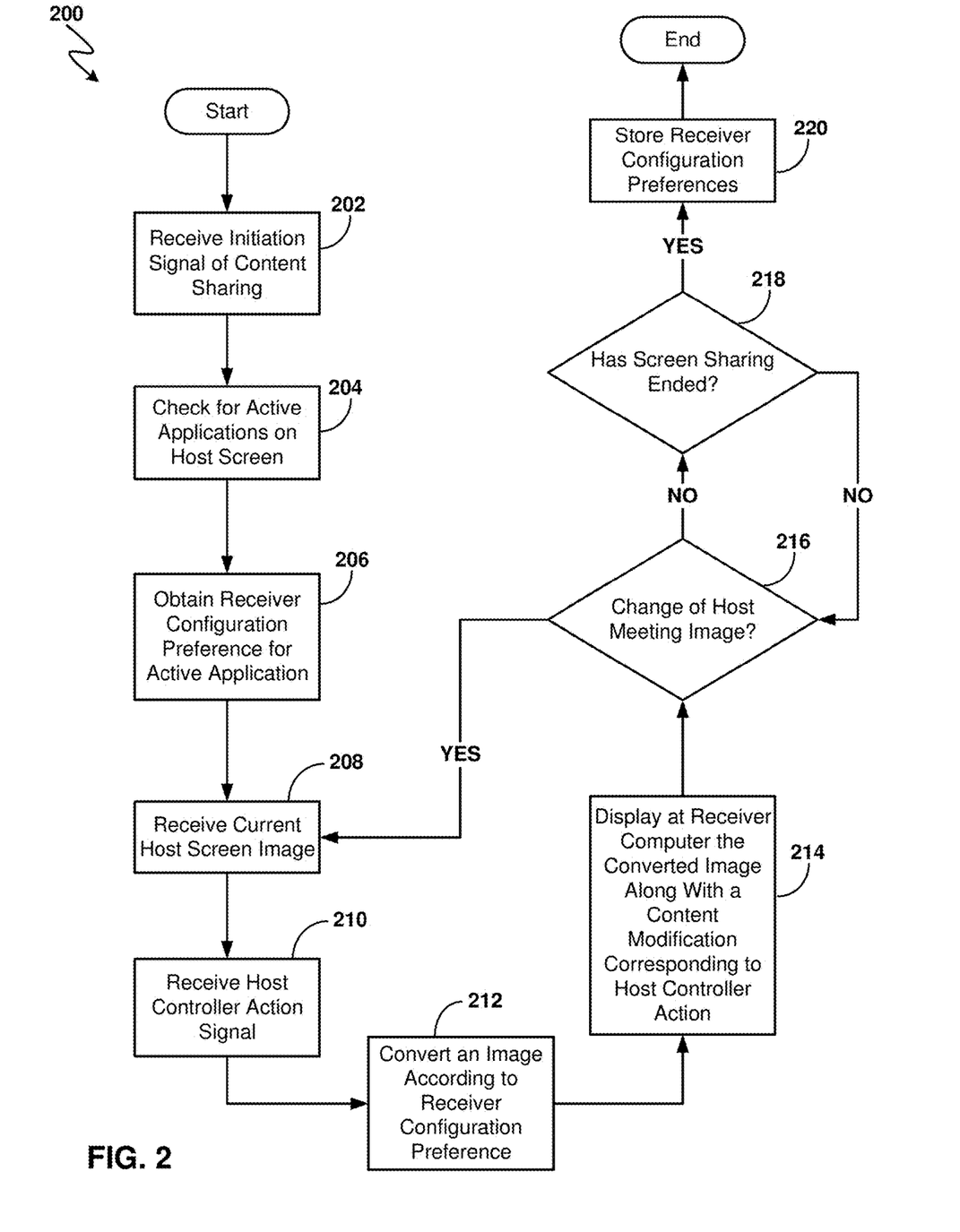
FIG. 2 is an operational flowchart illustrating an application sharing process according to at least one embodiment.

Referring now to FIG. 2, an operational flowchart depicts a meeting content presentation adjustment process 200 that may, according to at least one embodiment, be performed using the meeting content presentation adjustment program 110*a*, 110*b*1, 110*b*2, 110*b*3, 110*c*. The meeting content presentation adjustment program 110*a*, 110*b*1, 110*b*2, 110*b*3, 110*c* may include various modules, user interfaces, services, and virtual meeting tools and may use data storage when the meeting content presentation adjustment process 200 is performed.

The meeting content presentation adjustment program 110*a*, 110*b*1, 110*b*2, 110*b*3, 110*c* may include a configuration plugin, a controller plugin, and a converter plugin. The configuration plugin may be at the meeting content presentation adjustment program 110*b*1, 110*b*2, 110*b*3 at the respective receiver computer. The controller plugin may be at the meeting content presentation adjustment program 110*a* at the host computer 102. The converter plugin may be at the meeting content presentation adjustment program 110*b*1, 110*b*2, 110*b*3 at the respective receiver computer, at the meeting content presentation adjustment program 110*a* at the host computer 102, or at the meeting content presentation adjustment program 110*c* at the server 112 which may be in the cloud.

In a step 202 of the meeting content presentation adjustment process 200, an initiation signal of content sharing is received.

The initiation signal may be generated by a user actuating a graphical user interface button on a computer such as the host computer 102. For example, a user or a host at the host computer 102 shown in FIG. 1 may actuate a graphical user interface button that is being displayed on a display screen of the host computer 102. The meeting content presentation adjustment program 110*a* may be a plugin that operates in conjunction with digital meeting software program. Digital meeting software program such as WebEx® (WebEx and all WebEx-based trademarks and logos are trademarks or registered trademarks of Cisco Technology, Inc. and/or its affiliates) may be used in order to conduct a digital meeting between the host computer 102 and one or more of the first, second, and third receiver computers 104*a*, 104*b*, 104*c*. The graphical user interface button may be part of the digital meeting software program. Digital meeting software program may be installed on both the host computer 102 and the first, second, and third receiver computers 104*a*, 104*b*, 104*c* in order to enable the digital meetings to occur and to enable the transmission of image and audio components from host to receiver computers. The digital meeting software program may include screen sharing features and a chat function allowing text chat between meeting participants.

The meeting content presentation adjustment program 110*a* may be added onto the digital meeting software program so that actuation of the screen sharing button within the digital meeting software program notifies the meeting content presentation adjustment program 110*a*. The meeting content presentation adjustment program 110*a* may also have an application programming interface connection to the digital meeting software program installed on the host computer 102. This application programming interface connection may allow the meeting content presentation adjustment program 110*a* to receive, from the digital meeting software program, a notification of initiation of real-time screen sharing. The actuation of the graphical user interface button for screen sharing may occur via a user pressing one or more keys on the keyboard or on a touch screen keyboard, via performing one or more mouse clicks when the mouse cursor is positioned over the graphical user interface screen sharing button, via a user speaking an actuation command into a microphone connected to the host computer 102, and/or via other methods.

The initiation signal may be received by the meeting content presentation adjustment program 110*a* at the host computer or may be transmitted via the communication network 116 and received by one or more of the meeting content presentation adjustment program 110*b*1, 110*b*2, 110*b*3 at the first, second, and third receiver computers 104*a*, 104*b*, 104*c* and the meeting content presentation adjustment program 110*c* at the server 112.

The screen sharing performed by the digital screen sharing program may transmit one or more digital files with meeting content that may include word processing documents, murals, pictures, videos, audio recordings, spreadsheets, images, project management and team collaboration tool documents/boards, slides, frames, etc. The one or more digital files may include various components of an audio, visual, or audiovisual nature which may be transmitted during a virtual meeting to provide information to virtual meeting attendees. The various components may help provide crisp information that will interest virtual meeting attendees/participants and may be easily viewed and in some embodiments reviewed by the content receivers.

The meeting content that is received may be stored in memory that is part of the meeting content presentation adjustment program 110*a*, 110*b*1, 110*b*2, 110*b*3, 110*c* or that is accessible to the meeting content presentation adjustment program 110*a*, 110*b*1, 110*b*2, 110*b*3, 110*c*. For example, meeting content may be saved in the database 114 shown in FIG. 1, in the RAM 908 that is shown in FIG. 4, in memory of a server within and connected to the communication network 116, and/or in other memory in one or more remote servers that is accessible to the meeting content presentation adjustment program 110*a*, 110*b*1, 110*b*2, 110*b*3, 110*c* via the communication network 116 and/or via a wired connection.

In a step 204 of the meeting content presentation adjustment process 200, a check for active applications on the host screen is performed. The meeting content presentation adjustment program 110*a* at the host computer 102 may evaluate the screen of the host computer 102 to identify the active application whose output is being currently displayed on the screen. The application may be a source code editor, a web browser, and/or a document editing tool.

Examples of source code editors whose display appearance may be adjusted via the meeting content presentation adjustment process 200 and whose output on the display screen of the host computer 102 may be recognized in step 204 include Eclipse® (Eclipse is a trademark or a registered trademark of Eclipse.org Foundation, Inc. and/or its affiliates) and Visual Studio® (Visual Studio is a trademark or a registered trademark of Microsoft Corporation). Other source code editors may be used as well in the meeting content presentation adjustment process 200.

Examples of web browsers whose display appearance may be adjusted via the meeting content presentation adjustment process 200 and whose output on the display screen of the host computer 102 may be recognized in step 204 include Internet Explorer® (Internet Explorer-based trademarks and logos are trademarks or registered trademarks of Microsoft, Inc. and/or its affiliates), Firefox® (Firefox-based trademark and logos are trademarks or registered trademarks of Mozilla Corporation and/or its affiliates), Safari® (Safari-based trademarks and logos are trademarks or registered trademarks of Apple, Inc. and/or its affiliates), and Google Chrome™ (Google Chrome-based trademarks are trademarks of Google, Inc. and/or its affiliates). Other web browsers may be used as well in the meeting content presentation adjustment process 200.

Examples of document editing tools whose display appearance may be adjusted via the meeting content presentation adjustment process 200 and whose output on the display screen of the host computer 102 may be recognized in step 204 include tools offered in the Microsoft Office Suite® (e.g., Word™, PowerPoint®, Excel®) (these are trademarks or registered trademarks of Microsoft, Inc.), Google Docs™ (trademark of Google, Inc.), Adobe Acrobat® (registered trademark of Adobe, Inc.), OpenOffice® (registered trademark of The Apache Software Foundation), and Apple Pages™ (trademark of Apple, Inc.). Other document editing tools may be used as well in the meeting content presentation adjustment process 200.

The meeting content presentation adjustment program 110a may query the host computer 102 to learn from which program the output that is being displayed on the display screen of the host computer 102 belongs or originates. The meeting content presentation adjustment program 110a may also have an application programming interface connection to the digital meeting software program to receive notification or identification of the application whose output content is being displayed via the real-time screen sharing.

In a step 206 of the meeting content presentation adjustment process 200, a receiver configuration preference for the active application is obtained. The receiver configuration preference may also be referred to as setting information. The receiver configuration preferences may relate to font style, font size, font color, background color, image zoom level, and/or other appearance features which may help a viewer better see the presented content. This step may include the obtaining of multiple receiver configuration preferences from a single receiver and/or the obtaining of multiple receiver configuration preferences from multiple users at different client receiver accounts, e.g., at the first, second, and/or third receiver computers 104a, 104b, 104c. The multiple users may have unique configuration preferences so that a unique customization of the screen image may be displayed at each receiver computer.

The user preferences that are available for modification may be presented to a respective client user at the first, second, or third receiver computer 104a, 104b, 104c via a graphical user interface that is shown on a display screen of the respective computer. The display may include one or more scrollable lists or swipable graphics that are displayed on the display monitor 924 of a respective receiver computer. The lists or graphics may include a list of all available font types, font sizes, colors, and zoom levels. The user preference GUIs may also include text entry fields where the end viewer may type in or speak (for speech-to-text) a raw number for a font size, a word indicating the font type, a desired color for text or background or border, a number for a zoom level (e.g., 10% to 400% zoom level), etc.

The obtaining of the user presentation preferences may occur before a virtual meeting begins or at the beginning of a virtual meeting. For preference acquisition that occurs before the beginning of the virtual meeting, the viewer preferences may be saved in a memory that is part of the meeting content presentation adjustment program 110a, 110b1, 110b2, 110b3, 110c or that is accessible to the meeting content presentation adjustment program 110a, 110b1, 110b2, 110b3, 110c. For example, the receiver configuration preferences may be saved in the database 114 shown in FIG. 1, in the RAM 908 that is shown in FIG. 4, in memory of an edge/gateway server or network edge server, and/or in other memory in one or more remote servers that are accessible to the meeting content presentation adjustment program 110a, 110b1, 110b2, 110b3 110c via the communication network 116. Storing the viewer preferences at memory of an edge/gateway server may reduce network traffic that is required during the presentation of the virtual meeting.

For the configuration preferences that are chosen, the meeting content presentation adjustment program 110b1, 110b2, 110b3 may display on the screen of the client user, e.g., on the screen of the first, second, and/or third receiver computer 104a, 104b, 104c, a sample display of how the configuration preferences will appear. The display of the sample presentation with the chosen configuration at this point via this presentation may allow the preparer to test whether the chosen enhanced configuration provides improved clarity for the client viewer. The meeting content presentation adjustment program 110a, 110b1, 110b2, 110b3, 110c may include, in memory storage, sample displays which can be adjusted according to user configuration preferences and then displayed with the chosen configuration adjustment for a test run for the client viewer. The preparer may accept the modification for the obtaining in step 206 and for the saving in step 220. Alternatively, the preparer may reject and try a different configuration so that the initially chosen configuration is discarded and not used during the virtual meeting presentation and not stored for future use.

In some embodiments at the beginning of a virtual meeting, the meeting content presentation adjustment program 110b1, 110b2, 110b3 may generate a bypass graphical user interface (GUI) which asks whether a respective client end viewer at the respective first, second, or third receiver computer 104a, 104b, 104c would like to skip or bypass meeting content presentation adjustment for the current virtual meeting. The user may actuate the bypass GUI so that the meeting content presentation adjustment program 110b1, 110b2, 110b3 may skip the presentation adjustment for the particular session or meeting. During the bypass, the respective receiver computer may display the host image as the host image appears on the host computer 102. Such bypassing may be appropriate, for example, if an individual other than the receiver computer owner or other than the usual receiver computer user is using the respective receiver computer for a one-time basis and the usual receiver computer user will use the respective computer in the future and in future meetings will use a customized configuration preference.

The meeting content presentation adjustment program 110a, 110c at the host computer 102 or server 112, respectively, may request the receiver configuration preferences from the meeting content presentation adjustment program 110b1, 110b2, 110b3 at the first, second, or third receiver computer 104a, 104b, 104c or from the memory in which the previously-provided receiver configuration preferences had been stored. The meeting content presentation adjustment program 110a, 110c may receive the preferences via a data transmission through the communication network 116.

The receiver configuration preferences and setting information may be automatically created by evaluating previous client choices for configurations of respective applications on the client side. The meeting content presentation adjustment program 110b1, 110b2, 110b3 may give the client user a chance to confirm the automatically generated receiver configuration preferences. The client user may manually input and edit the receiver configuration preferences.

Multiple batches of setting information/receiver configuration preferences may be registered. The list of choices may be presented to a user at the respective receiver computer at the beginning of a virtual meeting in a configuration choice GUI. The user may select one or more of these configurations at the time of use, e.g., at the beginning of the virtual meeting, by actuating a presented entry of the list in the configuration choice GUI. A configuration plugin may send the setting information/receiver configuration preferences to the controller plugin.

A user may dynamically change configuration preferences by choosing to enter or accept a particular appearance configuration. After the display has happened in step 214, the user may again change the configuration by actuating GUI buttons displayed on a tab for the meeting content presentation adjustment program 110b1, 110b2, 110b3 displayed at the respective first, second, or third receiver computer 104a, 104b, 104c.

For example, a first user, User A, may set presentation preferences for larger fonts, when the text will still fit within the screen, and for different background colors. A second user, User B, may set presentation preferences to change a background color or a background graphic, a type of letters, and a size of letters. A third user, User C, may set their preferences for an enlarged, view for all individual images in an editing tool. User A, User B, and User C may be viewing the virtual meeting at the first, second, and third receiver computers 104a, 104b, and 104c, respectively.

Figure 3A:
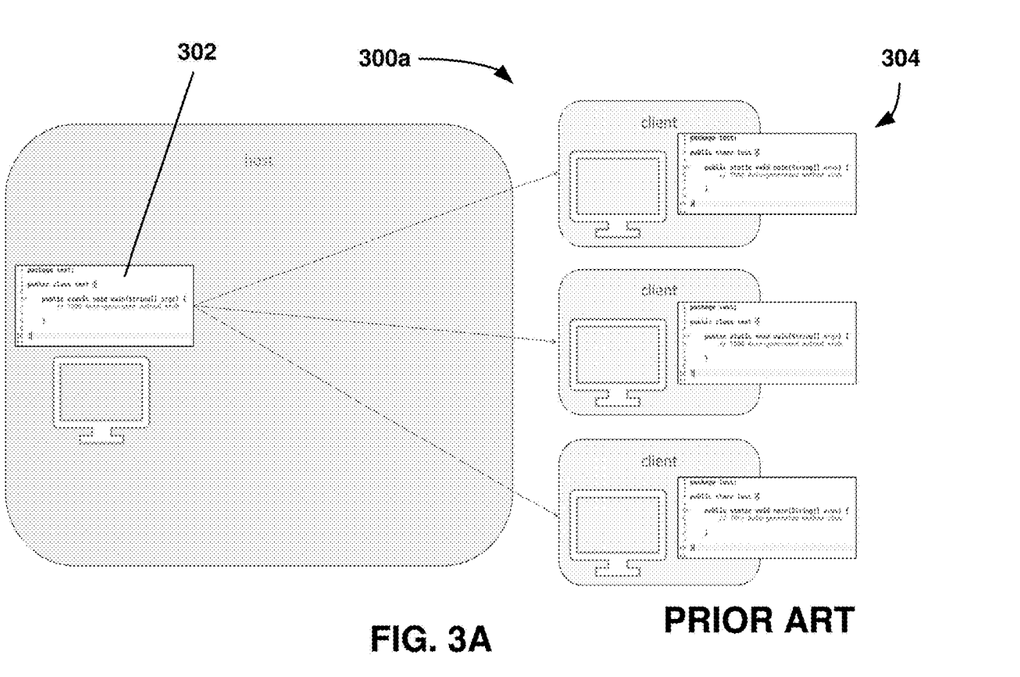
FIG. 3A shows a prior art view of content appearance when screen sharing occurs during an online meeting.

FIG. 3A shows traditional screen sharing 300a in which a traditional host computer 302 screen shares with multiple traditional receiver computers 304 who have the same view and presentation that the traditional host computer 302 has.

Figure 3B:
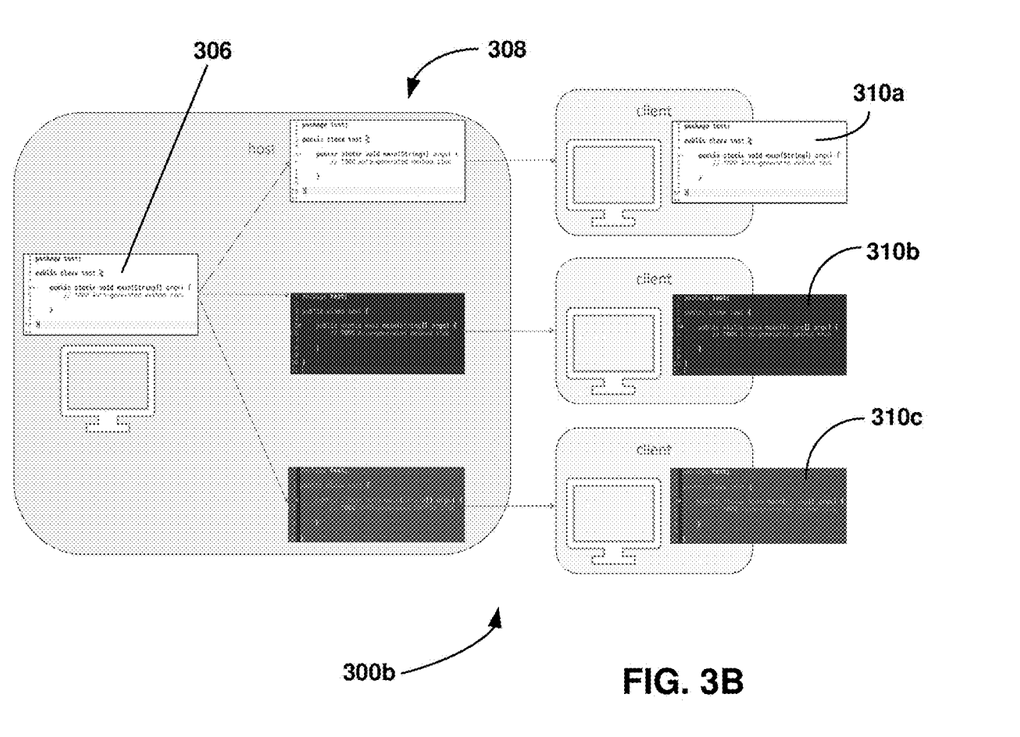
FIG. 3B shows various views modified according to presentation preferences of virtual meeting viewers according to at least one embodiment.

FIG. 3B shows an example of adjustment embodiments 300b of meeting content presentation adjustment. FIG. 3B shows first, second, and third end device views 310a, 310b, and 310c, respectively, that are displayed on screens for users at their computers at the same time that the host at a host screen 306 sees screen-shared contents during a digital meeting presentation or virtual meeting. The host may see the host screen 306 at the screen of the host computer 102 shown in FIG. 1. A conversion 308 of the contents of the host screen 306 is performed to create the second and third end device views 310b, 310c which are altered. The first, second, and third end device views 310a, 310b, and 310c, respectively, show examples of different views that may occur at the same time during the virtual meeting or at the same point within the virtual meeting. The second and third end device views 310b and 310c are both different from the display at the host screen 306, while the first end device view 310a is the same as the display at the host screen 306. The first end device view 310a may be the same as the view of the host screen 306 due to a bypass of a first client user who chooses to bypass using the meeting content presentation adjustment process 200 for a particular virtual meeting. In the second end device view 310b, the font colors are changed and a background color changed to a second color different from a first background color used at the host screen 306. In the third end device view 310c, a third background color different from the second background color at the second end device view 310b and different from the first background color used at the host screen 306 is visible. In the third end device view 310c, different font or text colors are used as well.

The user presentation preferences may also relate to a positioning for text on the screen. Some user may prefer to have text shown in a lower, higher, more leftward, or more rightward position on the display screen of the user or may prefer a combination of these position changes.

In a step 208 of the meeting content presentation adjustment process 200, a current host screen image is received. The current host screen image may be the image that is currently displayed on the screen of the host computer 102 or on a particular window of the host computer 102. The receiving of step 208 may occur at the meeting content presentation adjustment program 110a, 110b, 110b2, 110b3, or 110c at the host computer 102, at the first, second or third receiver computer 104a, 104b, 104c, or at the server 112, respectively.

The image may be broken into packets of information that are transmitted to the meeting content presentation adjustment program 110a, 110b, 110b2, 110b3, or 110c. The packets of information describe or depict the image displayed on the host screen. The meeting content presentation adjustment program 110a may receive the image in packet form from the display of the host computer 102 or from the host computer 102. The meeting content presentation adjustment program 110a at the host computer 102 may receive the image before the image is broken into packets for transmission via the communication network 116.

The packets as data or a transmitted image file may be encrypted for protection during their transmission through the communication network 116. The data may arrive as an image file, e.g., a JPEG or a GIF, or as individual pixel data assigned to particular X and Y coordinates. The data may be compressed to minimize the amount of necessary bandwidth. Once an initial image or image data is sent, then sending information regarding changes on the screen on the host image may allow the amount of data transmission to be reduced, as opposed to repeatedly transmitting repeat data. The digital meeting software program alone or together with the meeting content presentation adjustment program 110b1, 110b2, 110b3 may build the image by combining individual data pieces or packets.

In a step 210 of the meeting content presentation adjustment process 200, a host controller action signal is received. The host controller action may be a movement of the mouse cursor, a scrolling of the screen, a clicking of the mouse (e.g., a right or left click of the mouse) which may activate a GUI feature on the screen or may trigger the generation of a feature box on the screen, etc. The host controller action may be performed at the host computer 102. The performance of the host controller action may generate the host controller action signal, as the meeting content presentation adjustment program 110a at the host computer 102 may be provided signals generated from user input into the input tools, e.g., into a keyboard, microphone, mouse, etc., of the host computer 102. The host controller action signal may represent the host controller action taken. Each unique host controller action that is taken may generate a respective unique host controller action signal that may be transmitted within the host computer 102 or via the communication network 116.

The receiving of step 210 may occur at the meeting content presentation adjustment program 110a, 110b1, 110b2, 110b3, or 110c at the host computer 102, at the first, second or third receiver computer 104a, 104b, 104c, or at the server 112, respectively.

In a step 212 of the meeting content presentation adjustment process 200, an image is converted according to the receiver configuration preference. The receiver configuration preference may be that preference obtained in step 206. This conversion of the image may be performed at the meeting content presentation adjustment program 110a at the host computer 102, at the meeting content presentation adjustment program 110c at the server 112, and/or at the respective presentation adjustment program at a respective client receiver computer, e.g., at the meeting content presentation adjustment program 110b1, 110b2, 110b3 at the first, second, or third receiver computer 104a, 104b, 104c, respectively. The portion of the meeting content presentation adjustment program 110a, 110b1, 110b2, 110b3, 110c which performs the image conversion may be referred to as a converter plugin. A controller plugin of the meeting content presentation adjustment program 110a, 110b1, 110b2, 110b3, 110c may send the setting information/receiver configuration preference to the converter plugin so that the converter plugin is able to perform the conversion. Performing the conversion at the host computer 102 may in some instances improve accuracy and dependability, as the converted image may be transmitted through the communication network 116 to the destination receiver computer.

The converted screen image created in step 212 is different compared to the image that is currently displayed on the host screen 306, e.g., of the host computer 102. The converted image may include a converted portion of the original image and an unaltered portion of the original image. Examples of converted portions of the image include changes to the font of the text in the image, changes to colors in the image, changes to both the font and colors in the image, changes to zoom levels of image portions of the overall image, and other combinations of these examples.

The setting information and the receiver configuration preferences that were obtained in step 206 are used together with the original host image received in step 208 along with the host controller action corresponding to the host controller action signal received in step 210 to convert the screen image to the correctly adjusted form according to the configuration preference. By integrating the host controller action into the image conversion, action operations on the host side such as cursor movement and screen scrolling may be included in the converted image.

In at least one embodiment, the converter plugin may generate a first converted image using the configuration preference and the original host screen image and may send the first converted image to the controller plugin. The controller plugin may then use the first converted image and the host controller action signal to create a second converted screen image that includes a content modification corresponding to the host controller action. The host controller action may be a movement of the mouse cursor, a scrolling of the screen, a clicking of the mouse button, etc.

If the application for which the screen is shared is installed also on the client side, the conversion of step 212 can be performed on the client side by plugging the converter plugin in the application at a respective receiver computer. In this case, it is necessary to send information such as text information and cursor position to the client receiver computer via the communication network 116.

The converter plugin which performs the conversion may also be installed as a part of the meeting content presentation adjustment program 110c in a separate server, e.g., in server 112, which is separate from both the host computer 102 and the respective receiver computer. In this embodiment, the server 112 may be considered a cloud server and the conversion may be performed there or at another cloud server. The converted image may then be transmitted via the communication network 116 to the respective receiver computer, e.g., to the first, second, or third receiver computer 104a, 104b, 104c, for display.

In at least some embodiments, the conversion of step 212 may also include converting an image file from a host screen into a more compatible format. For example, the conversion may change the image of a host screen showing output of a first word processing program (e.g., Microsoft® Word™) into a second format (e.g., a PDF format) which has an improved compatibility for certain implementations.

In at least some embodiments, the conversion of step 212 may also include the masking of confidential information that appears on the screen of the host computer 102 and which the host does not want displayed on any receiver computer. The host may use GUI features at the host computer 102 that were generated by the meeting content presentation adjustment program 110a which allow certain portions of a screen to be designated as confidential so that these portions are masked in the converted image that is created in step 212.

The steps 202 through 212 may be executed as some of the functions of the operating system of the host computer 102 or may be executed as functions plugged in the application and in a screen sharing tool that work on the operating system of the host computer 102.

In a step 214 of the meeting content presentation adjustment process 200, the converted image along with a content modification corresponding to host controller action are displayed at the receiver computer. The converted image may be that image that was created in step 212. The screen sharing tool on the host side may send the created screen image to the screen sharing tool on the client side. The receiver computer may be the first, second, or third receiver computer 104a, 104b, 104c or another receiver computer. This altered display may be displayed at multiple receiver computers. Multiple receiver computers may share a configuration preference or may each have their own configuration preference.

If the host controller action was a cursor movement, the content modification may include the other converted image remaining the same except for the positioning of the cursor on the screen. If the host controller action was screen scrolling, the content modification may include some new image portions and some previous image portions being moved upward or downward in their positioning on the converted image. If the host controller action was a mouse click to generate a GUI on a portion of the screen, the content modification may include the new GUI that is overlaid over previous image portions of the original converted image.

This display in step 214 may occur for the converted image produced from step 212. The display or presentation may occur at a display monitor of each audience receiver, e.g., at a respective display monitor 924 of each of the first, second, and third receiver computers 104a, 104b, 104c. A respective microphone connected to each audience receiver, e.g., to each of the first, second, and third receiver computers 104a, 104b, 104c, may also assist in the digital meeting by playing audio files that are transmitted along with the digital files for the image and converted image.

In some embodiments, meeting content materials, e.g., with converted images, may be transmitted to the end devices before the virtual meeting begins. A live stream may include audio that is spoken live by the presenter at the host computer 102. In other embodiments, the meeting content materials, e.g., with converted images, are sent in segments to the audience receivers, e.g., to the first, second, and third receiver computers 104a, 104b, 104c, as the virtual meeting presenter progresses through the presentation.

The display of step 214 may in some embodiments include a first display of a converted image without a content modification corresponding to a host controller action and a second display of another converted image in which a content modification corresponding to a host controller action is incorporated into a further converted image.

In a step 216 of the meeting content presentation adjustment process 200, a determination is made as to whether the host meeting screen image has changed. This change is in comparison to the host screen image that was received in step 208. If the host meeting screen image has changed, the meeting content presentation adjustment process 200 returns to step 208 for a repeat of steps 208 through 214. If the host meeting screen image has not changed, the meeting content presentation adjustment process 200 proceeds to step 220. The determination may be made by the controller plugin which monitors actions of the mouse and the keyboard on the host side. A host controller action such as a movement of the mouse cursor, a scrolling of the screen, a clicking of the mouse, e.g., a right click of the mouse, a pressing of a key on the keyboard, etc. to change the content of the screen may be recognized by the controller plugin of the meeting content presentation adjustment program 110a at the host computer 102.

In a step 218 of the meeting content presentation adjustment process 200, a determination is made as to whether screen sharing has ended. If screen sharing has not ended, the meeting content presentation adjustment process 200 returns to step 216 for a repeat of step 216. If screen sharing has ended, the meeting content presentation adjustment process 200 proceeds to step 220.

In at least some embodiments, the meeting content presentation adjustment program 110a, 110b1, 110b2, 110b3, 110c and/or the digital meeting software program may generate a virtual meeting ending graphical user interface (GUI) component whose actuation may terminate the broadcast of the virtual meeting from the host computer 102 to the end devices, e.g., to the first, second, and third receiver computers 104a, 104b, 104c. The presenter or another administrator may use a keyboard 926, computer mouse 928, a microphone connected to the computer, a touch screen, or some other input device connected to the computer, e.g., to the host computer 102, to actuate such virtual meeting ending GUI component. The meeting content presentation adjustment program 110a may display the virtual meeting ending GUI component on the display monitor 924 or on a screen of the host computer 102. Another virtual meeting ending GUI component may be displayed on the screens of the end devices, e.g., on the screens of the first, second, and third receiver computers 104a, 104b, 104c, to allow an alternative way for the meeting content presentation adjustment program 110b1, 110b2, 110b3 to have the display of the virtual meeting to cease. End client users may actuate this button using a keyboard 926, computer mouse 928, a microphone connected to the first, second, or third receiver computer 104a, 104b, 104c, a touch screen, or some other input device connected to the receiver computer, e.g., to the first, second, or third receiver computer 104a 104b, 104c, to end the virtual meeting.

In a step 220 of the meeting content presentation adjustment process 200, receiver configuration preferences are stored. The receiver configuration preferences may be those that were received in step 206. These receiver configuration preferences may be stored in memory that is part of the meeting content presentation adjustment program 110a, 110b1, 110b2, 110b3, 110c or in memory that is accessible to the meeting content presentation adjustment program 110a, 110b1, 110b2, 110b3, 110c. For example, the receiver configuration preferences may be saved in the database 114 shown in FIG. 1, in the RAM 908 that is shown in FIG. 4, in memory of an edge/gateway server or of a network edge server, and/or in other memory in one or more remote servers that are accessible to the meeting content presentation adjustment program 110a, 110b1, 110b2, 110b3, 110c via the communication network 116. Storing the enhanced content at memory of an edge/gateway server may reduce network traffic that is required during the presentation of the virtual meeting.

After the storing of step 220, the meeting content presentation adjustment process 200 is ended. The receiver configuration preferences that were saved in step 220 may be used during subsequent iterations of the meeting content presentation adjustment process 200. For example, in these subsequent performances of the meeting content presentation adjustment process 200, step 206 may be performed by obtaining these end user configuration preferences from computer memory storage.

It may be appreciated that FIGS. 2 and 3B provide illustrations of some embodiments and do not imply any limitations with regard to how different embodiments may be implemented. Many modifications to the depicted embodiment(s), e.g., to a depicted sequence of steps, may be made based on design and implementation requirements.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902a, 902b, 904a, 904b is representative of any electronic device capable of executing machine-readable program instructions. Data processing system 902a, 902b, 904a, 904b may be representative of a smart phone, a computer system, PDA, or other electronic devices. Examples of computing systems, environments, and/or configurations that may represented by data processing system 902a, 902b, 904a, 904b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Host computer 102, first, second, and third receiver computers 104a, 104b, and 104c, and server 112 may include respective sets of internal components 902a, 902b and external components 904a, 904b illustrated in FIG. 4. Each of the sets of internal components 902a, 902b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the meeting content presentation adjustment program 110a in host computer 102, and the meeting content presentation adjustment program 110c in server 112 may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory, or any other computer-readable tangible storage device that can store a computer program and digital information.

Each set of internal components 902a, 902b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the meeting content presentation adjustment program 110a, 110b1, 110b2, 110b3, 110c, 110d, 110e, can be stored on one or more of the respective portable computer-readable tangible storage devices 920, read via the respective R/W drive or interface 918 and loaded into the respective hard drive, e.g., the tangible storage device 916.

Each set of internal components 902a, 902b may also include network adapters (or switch port cards) or interfaces 922 such as a TCP/IP adapter cards, wireless wi-fi interface cards, or 3G, 4G, or 5G wireless interface cards or other wired or wireless communication links. The meeting content presentation adjustment program 110a in host computer 102 and the meeting content presentation adjustment program 110c in the server 112 can be downloaded from an external computer (e.g., server) via a network (for example, the Internet, a local area network or other, wide area network) and respective network adapters or interfaces 922. From the network adapters (or switch port adaptors) or interfaces 922, the meeting content presentation adjustment 110a in host computer 102 and the meeting content presentation adjustment program 110c in server 112 are loaded into the respective hard drive, e.g., the tangible storage device 916. The network may include copper wires, optical fibers, wireless transmission, routers, firewalls, switches, gateway computers and/or edge servers.

Each of the sets of external components 904a, 904b can include a computer display monitor 924, a keyboard 926, and a computer mouse 928. External components 904a, 904b can also include touch screens, virtual keyboards, touch pads, pointing devices, and other human interface devices. Each of the sets of internal components 902a, 902b also includes device drivers 930 to interface to computer display monitor 924, keyboard 926 and computer mouse 928. The device drivers 930, R/W drive or interface 918 and network adapter or interface 922 include hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
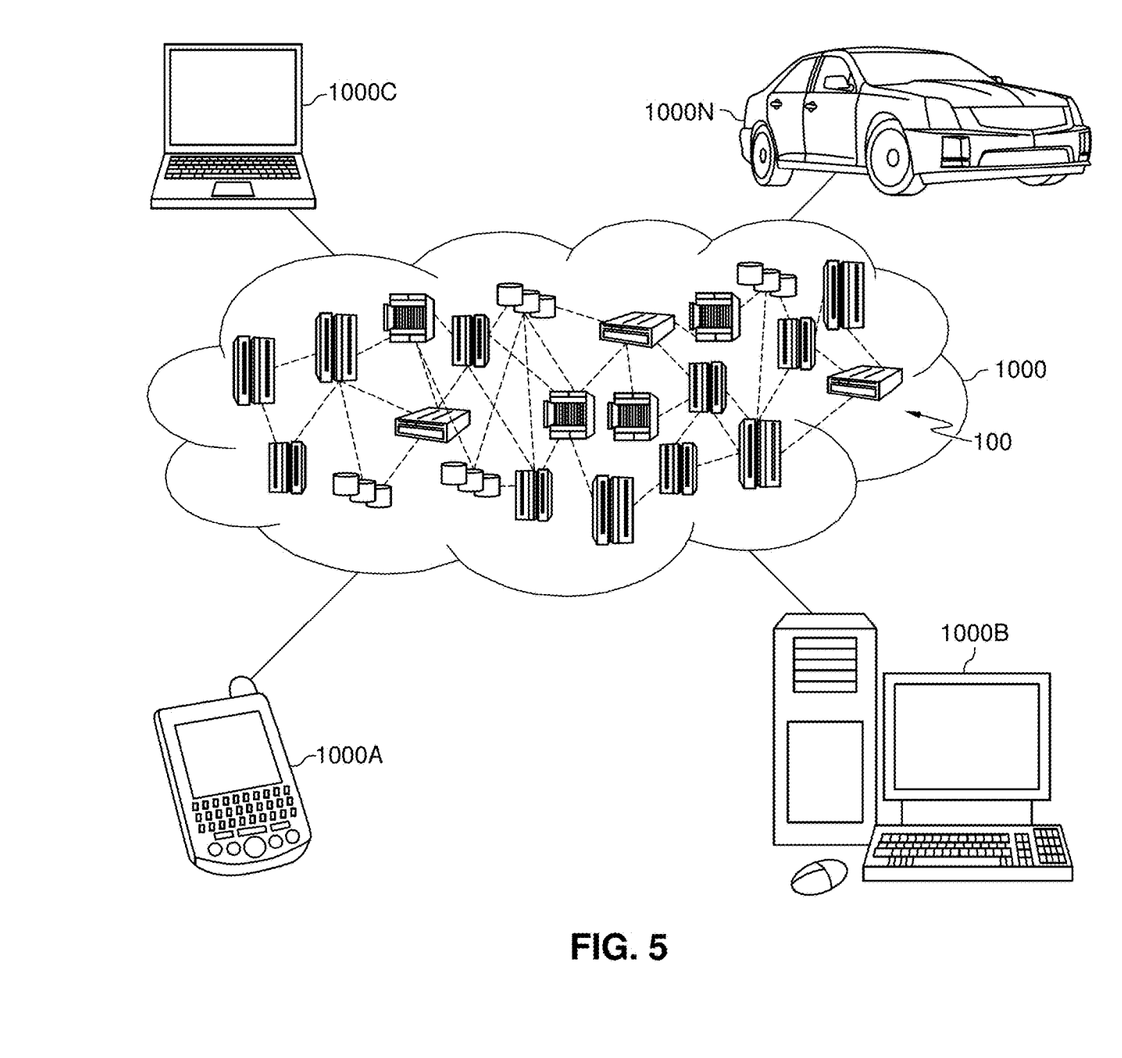
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1900 can communicate with any type of computerized device over any type of network and/or network addressable connection (e.g., using a web browser).

Figure 6:
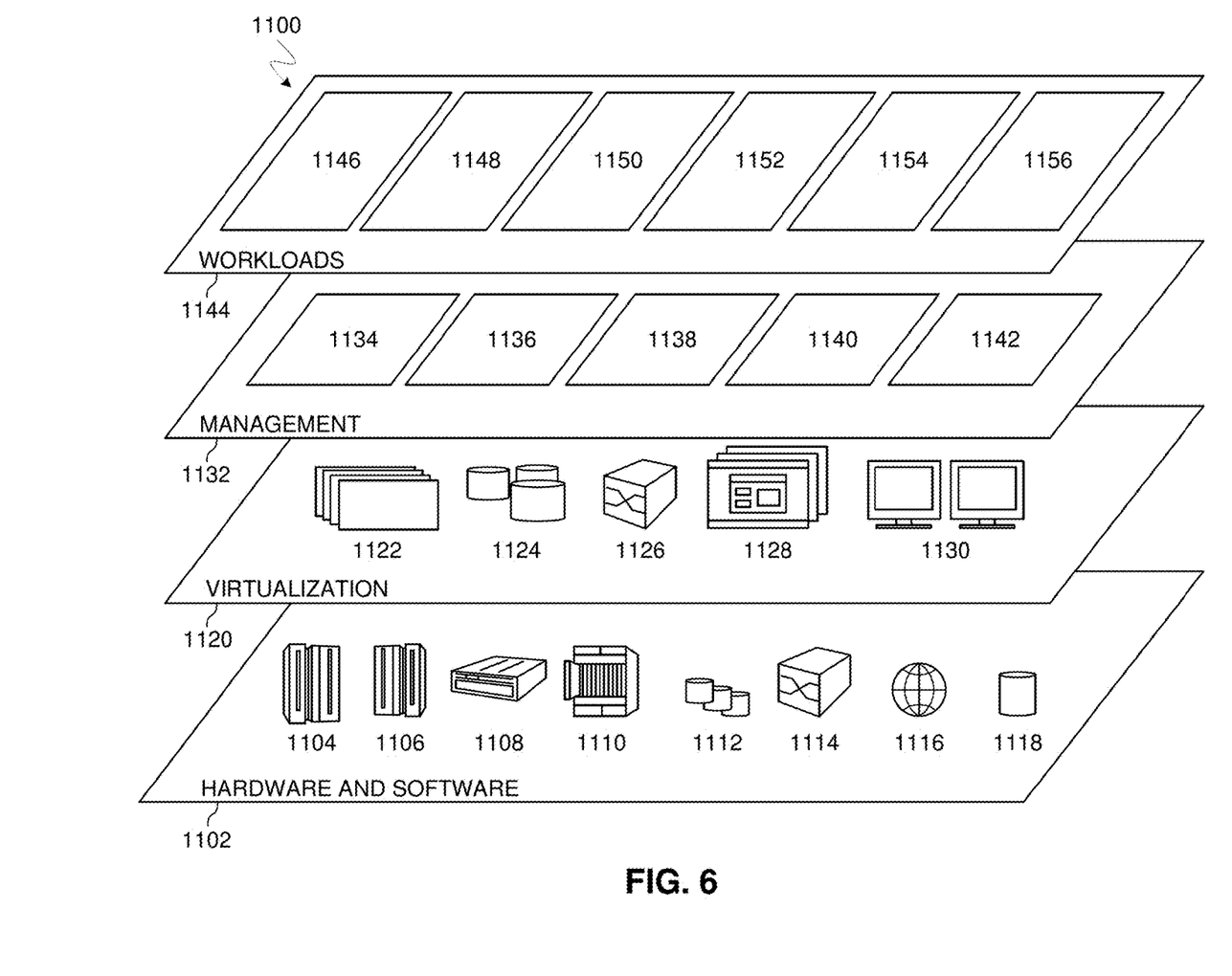
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and meeting content presentation adjustment 1156. A meeting content presentation adjustment program 110a, 110b1, 110b2, 110b3, 110c provides a way to allow client end users to see screen shared content more easily during a virtual meeting.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for application sharing, the method comprising:
    receiving setting information, the setting information comprising a display preference of a receiver, the display preference relating to text positioning on a display screen;
    receiving application content from a host computer, the application content comprising at least one screen image for a screen sharing session;
    receiving bypass information regarding image conversion for the screen sharing session;
    in response to the received bypass information indicating that image conversion should be performed:
        converting the at least one screen image according to the setting information;
        transmitting the converted at least one screen image to a receiver computer for real-time screen sharing in the screen sharing session with the host computer;
        receiving a host controller action signal, the host controller action signal representing a host controller action at the host computer; and
        transmitting a content modification to the receiver computer for the real-time screen sharing in the screen sharing session and for displaying with the converted at least one screen image according to the text positioning, wherein the content modification corresponds to the host controller action.

2. The method of claim 1, wherein setting information for respective unique display preferences of multiple receivers is received;
   wherein the at least one screen image is uniquely converted according to each of the respective unique display preferences;
   wherein the uniquely converted at least one screen images are respectively transmitted to multiple receiver computers for real-time screen sharing with the host computer; and
   wherein the content modification is transmitted to each of the multiple receiver computers for displaying with the uniquely converted screen images as part of the real-time screen sharing.

3. The method of claim 1, wherein the converting is performed at the host computer.

4. The method of claim 1, wherein the display preference further relates to a font of the at least one screen image.

5. The method of claim 1, wherein the display preference further relates to a font size of the at least one screen image.

6. The method of claim 1, wherein the display preference further comprises a color for the at least one screen image.

7. The method of claim 1, wherein the application content is from a source code editor.

8. A computer system for application sharing, the computer system comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
      receiving setting information, the setting information comprising a display preference of a receiver, the display preference relating to text positioning on a display screen;
      receiving application content from a host computer, the application content comprising at least one screen image for a screen sharing session;
      receiving bypass information regarding image conversion for the screen sharing session;
      in response to the received bypass information indicating that image conversion should be performed:
         converting the at least one screen image according to the setting information;
         transmitting the converted at least one screen image to a receiver computer for real-time screen sharing in the screen sharing session with the host computer;
         receiving a host controller action signal, the host controller action signal representing a host controller action at the host computer; and
         transmitting a content modification to the receiver computer for the real-time screen sharing in the screen sharing session and for displaying with the converted at least one screen image according to the text positioning, wherein the content modification corresponds to the host controller action.

9. The computer system of claim 8, wherein setting information for respective unique display preferences of multiple receivers is received;
   wherein the at least one screen image is uniquely converted according to each of the respective unique display preferences;
   wherein the uniquely converted at least one screen images are respectively transmitted to multiple receiver computers for real-time screen sharing with the host computer; and
   wherein the content modification is transmitted to each of the multiple receiver computers for displaying with the uniquely converted screen images as part of the real-time screen sharing.

10. The computer system of claim 8, wherein the converting is performed at the host computer.

11. The computer system of claim 8, wherein the display preference further relates to a font for text of the at least one screen image.

12. The computer system of claim 8, wherein the display preference further relates to a font size for text of the at least one screen image.

13. The computer system of claim 8, wherein the display preference further comprises a color for the at least one screen image.

14. The computer system of claim 8, wherein the application is selected from the group consisting of a source code editor, a web browser, and a document editing tool.

15. A computer program product for application sharing, the computer program product comprising a computer-readable storage medium having program instructions embodied therewith, wherein the program instructions are executable by a computer system to cause the computer system to perform a method comprising:
   receiving setting information, the setting information comprising a display preference of a receiver, the display preference relating to text positioning on a display screen;
   receiving application content from a host computer, the application content comprising at least one screen image for a screen sharing session;
   receiving bypass information regarding image conversion for the screen sharing session;
   in response to the received bypass information indicating that image conversion should be performed:
      converting the at least one screen image according to the setting information;
      transmitting the converted at least one screen image to a receiver computer for real-time screen sharing in the screen sharing session with the host computer;
      receiving a host controller action signal, the host controller action signal representing a host controller action at the host computer; and
      transmitting a content modification to the receiver computer for the real-time screen sharing in the screen sharing session and for displaying with the converted at least one screen image according to the text positioning, wherein the content modification corresponds to the host controller action.

16. The computer program product of claim 15, wherein setting information for respective unique display preferences of multiple receivers is received;
   wherein the at least one screen image is uniquely converted according to each of the respective unique display preferences;
   wherein the uniquely converted at least one screen images are respectively transmitted to multiple receiver computers for real-time screen sharing with the host computer; and wherein the content modification is transmitted to each of the multiple receiver computers for displaying with the uniquely converted screen images as part of the real-time screen sharing.

17. The computer program product of claim 15, wherein the converting is performed at the host computer.

18. The computer program product of claim 15, wherein the display preference further relates to a font or a font size for text of the at least one screen image.

19. The computer program product of claim 15, wherein the display preference further comprises a color for the at least one screen image.

20. The computer program product of claim 15, wherein the application is selected from the group consisting of a source code editor, a web browser, and a document editing tool.

21. A computer-implemented method for application sharing, the method comprising:
   receiving setting information, the setting information comprising a display preference of a receiver, the display preference relating to text positioning on a display screen;
   receiving application content from a host computer, the application content comprising at least one screen image for a screen sharing session and comprising masking of confidential information shown on a screen of the host computer;
   receiving bypass information regarding image conversion for the screen sharing session;
   in response to the received bypass information indicating that image conversion should be performed:
      converting the at least one screen image according to the setting information;
      transmitting the converted at least one screen image at a receiver computer for real-time screen sharing in the screen sharing session with the host computer;
      receiving a host controller action signal, the host controller action signal representing a host controller action at the host computer; and
      transmitting a content modification to at the receiver computer for the real-time screen sharing and for displaying with the converted at least one screen image and with the confidential information masked for non-display at the receiver computer, wherein the content modification corresponds to the host controller action;
   wherein the application content is from a web browser.

22. The method of claim 21, wherein setting information for respective unique display preferences of multiple receivers is received;
   wherein the at least one screen image is uniquely converted according to each of the respective unique display preferences;
   wherein the uniquely converted at least one screen images are respectively transmitted to multiple receiver computers for real-time screen sharing with the host computer; and
   wherein the content modification is transmitted to each of the multiple receiver computers for displaying with the uniquely converted screen images as part of the real-time screen sharing.

23. The method of claim 21, wherein the converting is performed at the host computer.

24. The method of claim 21, wherein the display preference further relates to a font for text of the at least one screen image, further relates to a font size for text of the at least one screen image, or further comprises a color for the at least one screen image.

25. A computer-implemented method for application sharing, the method comprising:
   transmitting a list of batches of setting information to a receiver;
   receiving a selection of one of the batches of setting information, the setting information comprising a display preference of a receiver, the display preference relating to text positioning on a display screen;
   receiving application content from a host computer, the application content comprising at least one screen image for a screen sharing session;
   receiving bypass information regarding image conversion for the screen sharing session;
   in response to the received bypass information indicating that image conversion should be performed:
      converting the at least one screen image according to the selected batch of setting information;
      transmitting the converted at least one screen image to a receiver computer for real-time screen sharing in the screen sharing session with the host computer;
      receiving a host controller action signal, the host controller action signal representing a host controller action at the host computer; and
      transmitting a content modification to the receiver computer for the real-time screen sharing and for displaying with the converted at least one screen image, wherein the content modification corresponds to the host controller action;
   wherein the application content is from a document editing tool.

* * * * *